United States Patent [19]

Phillips et al.

[11] 4,451,775

[45] May 29, 1984

[54] MOTOR/GENERATOR STARTING CIRCUIT

[75] Inventors: Graham R. Phillips, St. Louis; Norvell G. Prudot, Imperial, both of Mo.

[73] Assignee: Century Electric, Inc., St. Louis, Mo.

[21] Appl. No.: 292,336

[22] Filed: Aug. 12, 1981

[51] Int. Cl.³ .......................... H02P 9/06; H02P 9/46
[52] U.S. Cl. ..................................... 322/10; 318/376; 318/755; 318/795; 322/29; 322/47; 322/35
[58] Field of Search ............... 318/743, 754, 755, 494, 318/795, 375, 376, 378; 322/10, 29, 47, 90, 95, 96, 44; 290/31; 310/168, 171

[56] References Cited

U.S. PATENT DOCUMENTS

| | | | |
|---|---|---|---|
| 2,011,126 | 8/1935 | Sprague | 318/795 |
| 2,057,214 | 10/1936 | Sleeter et al. | 318/795 |
| 2,145,616 | 1/1939 | Waterworth | 318/755 X |
| 2,981,846 | 4/1961 | Maurice et al. | 322/10 X |
| 3,029,350 | 4/1962 | Noddin | 322/64 X |
| 3,809,914 | 5/1974 | Kilgore et al. | 322/29 X |

*Primary Examiner*—R. J. Hickey
*Attorney, Agent, or Firm*—Rogers, Eilers & Howell

[57] ABSTRACT

A circuit for use with an induction generator. The circuit is arranged to initiate operation of the induction generator as a motor to bring the system up to operating speed and subsequently to rearrange the system automatically to cause the induction generator to operate in a generating mode. The automatic reconnection is effected as an incident of the motor reaching a preselected speed. Determination of the preselected speed may be effected by voltage responsive means in one form of the invention, and by centrifugal switch in another form of the invention. The control is effected by suitably selectively connecting the phase winding of the generator. In the illustrated embodiment, a starting capacitor and a power factor correction capacitor are automatically connected at proper times in the operation.

12 Claims, 2 Drawing Figures

MOTOR/GENERATOR STARTING CIRCUIT

BACKGROUND OF THE INVENTION

1. Field of the Invention

This invention related to controls for electrodynamic machines and in particular to a control for use with a nonselfstarting induction generator system.

2. Description of the Background Art

In one form of generating system, an induction generator is driven by a prime mover, such as a wind turbine. Such systems require that the induction generator be started by operating the generator as a motor until such time as the system is brought to operating speed.

When the generator reaches the operating speed, it is necessary to reconnect the phase winding of the generator to convert the operation from a motoring mode to the desired generating mode. The present invention is concerned with an improved automatic control circuit for effecting such starting and selective operation of the system.

SUMMARY OF THE INVENTION

More specifically, the invention comprehends an improved circuit for controlling an electrodynamic machine for causing the machine to start in a motoring mode and to be automatically reconnected to operate in a generating mode when the speed of the machine reaches a preselected speed.

In the illustrated embodiment, the electrodynamic machine comprises a single phase induction generator.

The invention comprehends the connection of the electrodynamic machine to a power source, such as a utility power supply, for operating the machine as a motor in startup.

The invention comprehends the provision of electric power from the generator back to the power supply by driving the generator above synchronous speed with the output thereof connected to the power supply.

The control circuit automatically effects a suitable reverse connection of the phase winding of the single phase induction generator.

The control circuit, in the illustrated embodiment, includes capacitor means. A reversing relay is provided in the illustrated embodiment for connecting the phase winding selectively in opposite directions and for concurrently connecting in series with the phase winding either the start capacitor or the power factor capacitor of the capacitor means when the machine is operating in the motoring mode and generating mode, respectively.

In the illustrated embodiment, the power factor correcting capacitor is preselected to provide a substantially unitary power factor when operating as a generator.

In one form, the means for controlling the reversing relay comprises a relay responsive to the voltage of the phase winding.

In another form, the means for selectively controlling the reversing relay comprises a centrifugal switch for controlling the coil of the reversing relay.

The control circuit of the present invention is extremely simple and economical while yet providing a highly desirable automatic control of an induction generator system.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
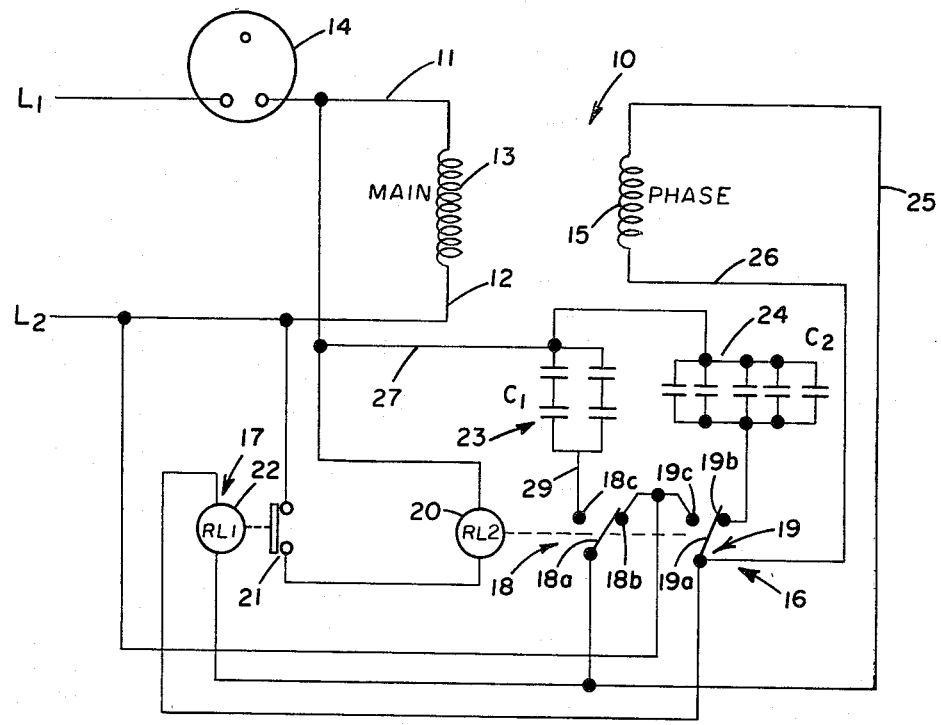
FIG. 1 is a schematic diagram of a control circuit embodying the invention.

In the illustrative embodiment of the invention as shown in FIG. 1 of the drawing, a control circuit generally designated 10 is shown to include power supply leads 11 and 12 for connecting the main induction generator winding 13 to an industrial power supply having conventional bus connections $L_1$ and $L_2$, respectively. A conventional thermal protector 14 may be provided in the lead 11. In the illustrated embodiment, the power supply comprises a 115-volt, 60-cycle alternating current industrial power supply.

As indicated briefly above, the induction generator may comprise a single phase induction generator having a phase winding 15. During startup, phase winding 15 is connected in a first direction of connection so as to permit the induction generator to operate in a motoring mode with power being supplied thereto from the power supply leads $L_1$ and $L_2$. Thus, the control circuit is arranged for use in systems, such as wind-powered generating systems, wherein the motor generating system is not self-starting.

As further shown in FIG. 1, the control circuit 10 includes a reversing relay generally designated 16 and a control relay generally designated 17. Reversing relay 16 is shown to include a first single pole, double throw switch 18 having a moving contact 18a, a first fixed contact 18b, and a second fixed contact 18c. The relay further includes a second single pole, double throw switch 19 having a moving contact 19a, a first fixed contact 19b, and a second fixed contact 19c. Selective positioning of the movable contacts 18a and 19a is effected in a conventional manner by the relay coil 20.

Control relay 17 includes a normally closed switch 21 controlled in a conventional manner by the relay coil 22 of the relay for opening switch 21 as an incident of energization of the coil 22.

The control circuit further includes a first capacitor means generally designated 23 and a second capacitor means generally designated 24. In the illustrated embodiment, capacitor 23 comprises a starting capacitor formed of four 500 mfd. 170 v. capacitors arranged in a parallel pair of series-connected pairs. Capacitor 24 comprises, in the illustrated embodiment, five 20 mfd. 440 v. capacitors connected in parallel. Thus, capacitor 24 has a substantially lower total capacitance than the capacitance of capacitor 23.

As shown in FIG. 1, relay coil 20 is connected from power supply lead 11 to power supply lead 12 through normally closed switch 21 of control relay 17. Moving contact 19a of reversing relay switch 19 is connected to the phase winding 15 through a lead 26 and moving contact 18a of reversing relay switch 18 is connected to phase winding 15 by a lead 25.

Fixed contact 19b of switch 19 is connected through capacitor 24 to power supply lead 11. Fixed contact 18c of switch 18 is connected through capacitor 23 to power supply lead 11.

Control relay coil 22 is connected across phase winding 15 by leads 25 and 26.

Fixed contact 18b and fixed contact 19c are connected to power supply lead 12.

In the embodiment of FIG. 1, relay coil 22 is thusly effectively connected in parallel with the phase winding 15 and, thus, is responsive to the voltage across phase winding 15 so as to open normally closed switch 21 when the voltage reaches a preselected value, conventionally reached when the induction generator reaches its normal operating speed when started in the motoring mode. In the motoring mode of operation, relay 20 is energised so that switches 18 and 19 are thrown from the de-energized position of FIG. 1. Thus, phase winding 15 is connected between power supply leads 11 and 12, with capacitor 23 in series therewith, by the circuit from power supply lead 12 through reversing relay fixed contact 19c now closed with moving contact 19a, and through lead 26. The other side of the phase winding is connected through reversing relay moving contact 18a and fixed contact 18c, through capacitor 23 to power supply lead 11. With electric power provided to power supply leads 11 and 12 from the power supply bus $L_1$ and $L_2$, the main winding 13 is energized between leads 11 and 12 and the motor/generator is connected in a motoring mode to drive the motor/generator up to the operating speed. In the illustrated embodiment, such startup will conventionally occur in no more than approximately 15 seconds.

Illustratively, where the motor/generator is a four pole machine, relay coil 22 may be preselected to effect opening of switch 21 when the voltage across phase winding 15 corresponds to that of the motor/generator operating at a speed of approximately 1600 rpm, which is 85% of synchronous speed.

As indicated above, coil 20 of reversing relay 19 is connected in series with the normally closed switch 21 of control relay 17. As the voltage across phase winding 15 is relatively low during startup, the voltage across relay coil 22 is relatively low, allowing switch 21 to remain closed until the motor/generator gets up to speed. Thus, in the illustrated embodiment, when the motor/generator reaches a speed of approximately 1600 rpm, coil 22 opens switch 21 to de-energize coil 20, causing moving contacts 18a and 19a of the reversing relay to be thrown to engagement with fixed contacts 18b and 19b, respectively, thus breaking the circuit to capacitor 23 and making the circuit to capacitor 24. However, as can be seen, moving contact 19a is now connected to power supply lead 11, and lead 25 is now connected through reversing relay moving contact 18a and reversing relay fixed contact 18b to power supply lead 12, thereby reversely connecting the phase winding 15 for proper operation of the induction generator now in the generating mode. As indicated above, the capacitor 24 may be preselected to provide a substantially unitary power factor in such generating mode operation.

Figure 2:
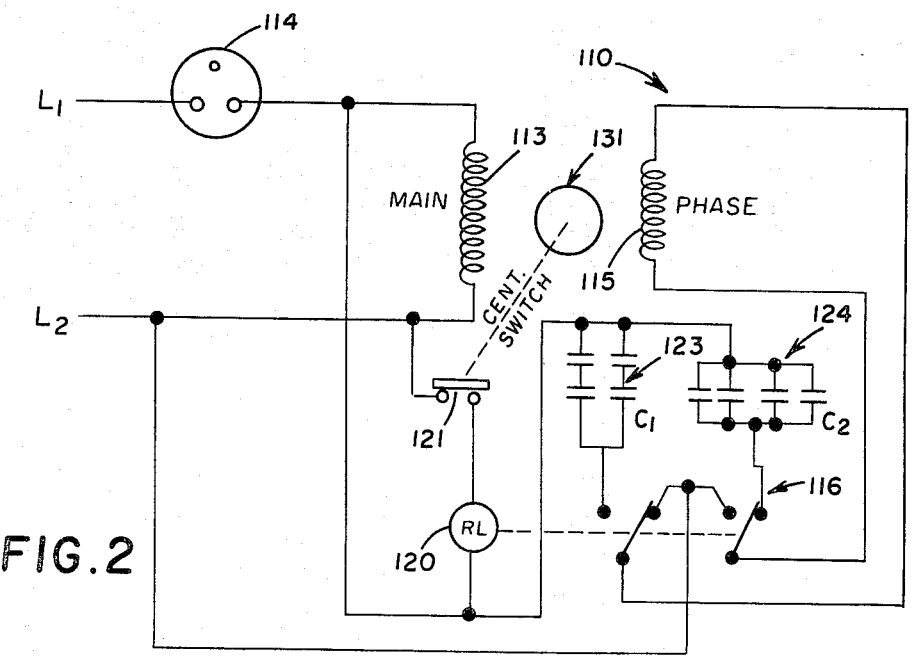
FIG. 2 is a schematic diagram of a modified form of control circuit embodying the invention.

Referring now to the embodiment of FIG. 2, a modified control circuit generally designated 110 is shown to comprise a control circuit generally similar to control circuit 10 but utilizing a centrifugal switch 131 in lieu of the control relay 17 of control circuit 10. As shown in FIG. 2, the normally closed switch 121 connected in series with the reversing relay coil 120 is controlled by the centrifugal switch which causes the normally closed contacts of switch 121 to open when the speed of the motor/generator, as sensed by the centrifugal switch, reaches the preselected operating speed. Control circuit 110 is otherwise identical to control circuit 10 and similar elements thereof are identified by similar reference numerals but 100 higher.

Control circuit 110 functions in a manner similar to that of control circuit 10 in providing initial operation of the motor/generator in a motoring mode until such time as the motor/generator reaches the generating operating speed, at which time the centrifugal switch 131 causes an automatic reversal of the reversing relay 116 to reconnect the phase winding and capacitors 124 and 123 suitably to effect the change from motoring to generating mode.

Thus, the control circuits of the present invention provide improved means for controlling an electrodynamic machine, such as an induction generator, by automatically arranging the system for startup in a motoring mode and transferring the system to a generating mode when the electrodynamic machine reaches the generating operating speed. The control circuits of the illustrated embodiments are extremely simple and economical of construction while yet providing the improved functioning in a novel and simple manner.

The foregoing disclosure of specific embodiments is illustrative of the broad inventive concepts comprehended by the invention.

We claim:

1. A circuit for controlling an electrodynamic machine having a main winding and a phase winding for starting the machine in a motoring mode and switching to a generating mode as an incident of the machine reaching a preselected speed, said circuit comprising:
   means for energizing the main winding;
   first capacitor means;
   second capacitor means having a capacitance lower than that of said first capacitor means; and
   control means for energizing the phase winding in a first direction of connection in series with said first capacitor means for causing said machine to operate in a motoring mode, and discontinuing energization of the phase winding in said first direction of connection and energizing the phase winding in a second direction of connection opposite to said first direction and in series with said second capacitor means as an incident of said machine reaching said preselected speed to cause said machine to operate in a generating mode.

2. The circuit of claim 1 wherein said control means comprises means responsive to the voltage across said phase winding.

3. The circuit of claim 1 wherein said control means comprises a reversing relay having contacts connected in series with said phase winding and said capacitor means, and means for selectively reversing the arrangement of said reversing relay to effect said energization in said opposite direction.

4. The circuit of claim 1 wherein said second capacitor means has a capacitance providing substantially unitary power factor in the operation of the machine with said phase winding in said second direction of connection.

5. The circuit of claim 1 wherein said generator comprises a single phase induction generator.

6. The circuit of claim 1 wherein said means for energizing the main winding comprises a utility alternating current power supply having a preselected frequency, said control means causing said generator to be connected in said generating mode for delivering electrical power to said utility power supply from said machine.

7. The circuit of claim 1 wherein said control means comprises relay means.

8. The circuit of claim 1 wherein said control means comprises centrifugal switch means.

9. A circuit for controlling a single phase induction generator having a main winding and a phase winding for starting the generator in a motoring mode and switching to a generating mode as an incident of the generator reaching a preselected speed, said circuit comprising:

means for energizing the main winding from a utility power supply; and control means for energizing the phase winding in a first direction of connection for causing said machine to operate in a motoring mode, and discontinuing energization of the phase winding in said first direction of connection and energizing the phase winding in a second direction of connection opposite to said first direction as an incident of said generator reaching said preselected speed to cause said machine to operate in a generation mode and provide electrical energy into said utility power supply.

10. The circuit of claim 9 including means for causing the power factor of the generated current to be substantially one.

11. The circuit of claim 9 including capacitor means for use in starting motoring generation.

12. The circuit of claim 9 wherein said control means comprises a reversing relay and means responsive to the speed of the generator to actuate said reversing relay.

* * * * *